United States Patent
Bensaih et al.

(10) Patent No.: US 12,135,043 B2
(45) Date of Patent: Nov. 5, 2024

(54) FAN MOTOR MOUNT WITH SHOCK ABSORBER AND STOP

(71) Applicant: VALEO SYSTEMES THERMIQUES, La Verriere (FR)

(72) Inventors: Elmehdi Bensaih, La Verriere (FR); Frederic Moulinas, La Verriere (FR); Guillaume Robelet, La Verriere (FR)

(73) Assignee: Valeo Systemes Thermiques, La Verriere (FR)

( * ) Notice: Subject to any disclaimer, the term of this patent is extended or adjusted under 35 U.S.C. 154(b) by 0 days.

(21) Appl. No.: 18/001,292

(22) PCT Filed: Jun. 3, 2021

(86) PCT No.: PCT/EP2021/064913
§ 371 (c)(1),
(2) Date: Dec. 9, 2022

(87) PCT Pub. No.: WO2021/249863
PCT Pub. Date: Dec. 16, 2021

(65) Prior Publication Data
US 2023/0250835 A1 Aug. 10, 2023

(30) Foreign Application Priority Data
Jun. 10, 2020 (FR) ...................... 2006087

(51) Int. Cl.
*F04D 29/66* (2006.01)
*F04D 25/08* (2006.01)
(Continued)

(52) U.S. Cl.
CPC ........... *F04D 29/668* (2013.01); *F04D 25/08* (2013.01); *H02K 5/24* (2013.01); *F04D 25/06* (2013.01); *F04D 29/626* (2013.01); *F16F 1/38* (2013.01)

(58) Field of Classification Search
CPC ...... F04D 29/668; F04D 29/626; F04D 25/06; F04D 25/08; H02K 5/24; F16F 1/38
See application file for complete search history.

(56) References Cited

U.S. PATENT DOCUMENTS

| 2,905,411 A | 9/1959 | Cunningham |
| 6,028,379 A * | 2/2000 | Bertolini .................. H02K 5/24 310/91 |

(Continued)

FOREIGN PATENT DOCUMENTS

| DE | 4136485 A1 | 5/1993 |
| EP | 2456053 A1 | 5/2012 |
| FR | 3053287 A1 | 1/2018 |

OTHER PUBLICATIONS

FR3053287—translation from Espacenet (Year: 2016).*
(Continued)

*Primary Examiner* — Brian P Wolcott
*Assistant Examiner* — Behnoush Haghighian
(74) *Attorney, Agent, or Firm* — Valeo Systemes Thermiques (57) ABSTRACT

Disclosed is a motor mount, in particular for a motor-driven fan unit of a fan for a vehicle heating, ventilating and/or air conditioning system, including two coaxial rings of which an inner ring is capable of receiving one or more elements of the motor and an outer ring is capable of being attached to a housing constituting a structural element, and an uncoupling element positioned between the coaxial rings. The uncoupling element forms at least one radial stop capable of limiting a radial relative movement, in a plane normal to the common axis of the two rings, of one of the two rings with respect to the other.

12 Claims, 6 Drawing Sheets

(51) Int. Cl.
*H02K 5/24* (2006.01)
*F04D 25/06* (2006.01)
*F04D 29/62* (2006.01)
*F16F 1/38* (2006.01)

(56) References Cited

U.S. PATENT DOCUMENTS

| | | | |
|---|---|---|---|
| 8,596,596 B2* | 12/2013 | Naji | F04D 29/668 248/315 |
| 2019/0074748 A1* | 3/2019 | Le Goff | H02K 5/24 |
| 2019/0376530 A1* | 12/2019 | Gontier | H02K 5/24 |

OTHER PUBLICATIONS

European Patent Office, International Search Report (with English translation) and Written Opinion of corresponding International Application No. PCT/EP2021/064913 dated Aug. 25, 2021.

* cited by examiner

FAN MOTOR MOUNT WITH SHOCK ABSORBER AND STOP

TECHNICAL FIELD

The present invention relates to the field of heating, ventilation and/or air conditioning devices for motor vehicles. The invention relates more particularly to an electric motor support for a fan. The invention also relates to a fan comprising such a motor support and to a heating, ventilation and/or air conditioning installation comprising such a fan.

BACKGROUND OF THE INVENTION

Motor vehicles are commonly equipped with a heating, ventilation and/or air conditioning installation, which makes it possible to create a flow of air in the passenger compartment. Such an installation also makes it possible to manage the temperature and the distribution, within the passenger compartment of the vehicles, of the flow of air created. Such a heating, ventilation and/or air conditioning installation has, inter alia, a fan comprising a fan impeller rotationally driven by an electric motor. The electric motor is in particular an electronically switched electric motor controlled by a power supply module.

An electronically switched electric motor, or brushless direct current motor, has a rotor and stator assembly, each of these components bearing electromagnetic elements whose interaction generates the movement of the rotor in relation to the stator and, ultimately, the movement of the fan impeller.

The electric motor is assembled in the heating, ventilation and/or air conditioning installation via a motor support which comprises an inner ring configured to accept the stator of the electric motor, and an outer ring able to be fixed, directly or indirectly, to a structural element of the vehicle.

A decoupling element is interposed between the inner ring and the outer ring. This decoupling element is intended to limit, or even to prevent, the transmission of vibration and/or stress generated by the rotation of the electric motor, from the inner ring to the outer ring. This then reduces the transmission, to the heating, ventilation and/or air conditioning installation, of vibrations that could be felt by the occupants of the vehicle.

The decoupling element allows a significant amount of relative movement of the inner ring with respect to the outer ring, particularly in the case of vibration. This relative movement can in particular be directed in a radial direction, in the plane of the two rings. In this case, the repetition of shocks and vibrations may in the long run lead to the appearance of cracks in the decoupling element, or even to its breakage. Significant temperature variations can also promote the breakage of the decoupling element. In critical cases, the fan impeller can then come into contact with the motor support or with the housing of the heating, ventilation and/or air conditioning installation, which generates considerable noise and must be avoided.

The object of the present invention is to provide a motor support, in particular for a fan of a heating, ventilation and/or air conditioning installation of a motor vehicle, which is simple to produce and which does not have at least some of the disadvantages of the supports of the prior art.

SUMMARY OF THE INVENTION

To this end, the subject of the invention is a motor support, in particular for a motorized fan unit of a fan of a heating, ventilation and/or air conditioning installation for a vehicle, comprising:

two coaxial rings, including an inner ring capable of receiving one or more motor elements and an outer ring capable of being fixed to a housing forming a structural element, a decoupling element between the two coaxial rings, the decoupling element forming at least one radial stop capable of limiting a radial relative movement, in a plane normal to the common axis of the two rings, of one of the two rings with respect to the other.

Thus, advantageously, the distance of a relative radial movement between the two rings is limited. As a result, the force in the event of a possible impact between the two rings is also reduced. The mechanical energy that has to be absorbed by the decoupling element is therefore reduced, and the reliability and the service life of the decoupling element are thereby increased.

Preferably, the motor support comprises one or more of the following features, considered alone or in combination:

the at least one radial stop extends between the inner ring and the outer ring; —the decoupling element comprises a ring made of elastic material, in particular a ring made of elastomeric material;

the inner ring and/or the outer ring is/are covered with elastic material at least on their face oriented toward the other ring, the elastic material covering the inner ring and/or the outer ring preferably being integral with the ring made of elastic material, if applicable;

the at least one radial stop comprises at least one lug of the inner ring, the at least one lug of the inner ring projecting radially in the direction of the outer ring, the at least one lug of the inner ring being covered with elastic material, at least on its face oriented toward the outer ring;

the at least one radial stop comprises at least one lug of the outer ring, the at least one lug of the outer ring projecting radially in the direction of the inner ring, the at least one lug of the outer ring being covered with elastic material, at least on its face oriented toward the inner ring;

each lug of the inner ring faces, in a radial direction, a lug of the outer ring, the distance between each lug of the inner ring, covered with elastic material, and the associated lug of the outer ring, covered with elastic material, preferably being between 2 mm and 4 mm;

the decoupling element comprises a plurality of blocks made of elastomeric material, interposed between the inner ring and the outer ring, each block having a substantially "H" shape, each block preferably having a thickness measured in the direction of the common axis of the two rings, greater than or equal to 10 mm, more preferably greater than or equal to 14 mm, and less than or equal to 20 mm, more preferably less than or equal to 16 mm;

each lug of the inner ring and/or each lug of the outer ring is located at one end of an arm of an "H" formed by a block, a lug of the inner ring or a lug of the outer ring being preferably at each end of an arm of an "H" formed by a block;

each block is flush with at least one of the two rings, in the direction of the common axis of the two rings;

the radial stop is flush with at least one of the two rings, in the direction of the common axis of the two rings;

the motor support comprises at least one element for limiting the tilting of the inner ring with respect to the outer ring, the element for limiting the tilting comprising a finger which projects from a first of the two rings and is housed in a receptacle formed in the second of the two rings, two axial stops being formed in the receptacle to limit the movement of the finger in the receptacle with respect to the direction of the common axis of the two rings;

the motor support comprises two blocks arranged angularly, symmetrically on either side of each finger;

the motor support comprises a plurality of fingers regularly distributed angularly around the common axis of the two rings;

the elastic material ring of the decoupling element is made of SEBS (polystyrene-b-poly(ethylene-butylene)-b-polystyrene) or silicone;

the elastic material ring of the decoupling element is overmolded on the inner ring and the outer ring;

the motor support further comprises an element for limiting, or even preventing, the relative rotation of the rings around the common axis of the two rings;

at least one of the axial stops projects into the receptacle;

elastic material is arranged between the finger and each of the two axial stops and in contact with the finger and one of the two axial stops, the elastomeric material preferably being compressed between the finger and each of the two axial stops, the elastomeric material having more preferably a compression ratio greater than or equal to 5% and/or less than or equal to 15%, more preferably substantially equal to 10%;

the motor support comprises the same thickness of elastomer between the finger and each of the two axial stops;

the at least one axial stop extends in a direction substantially perpendicular to the direction of elongation of the finger;

the motor support comprises two axial stops projecting into the receptacle, arranged on either side of the finger, the two projecting axial stops facing each other;

the elastic material is overmolded on two opposite faces of the finger;

the elastic material has a hardness of between 25 and 50 Shore;

the elastic material in contact between the finger and each of the two stops is integral with the ring made of elastomeric material;

the finger has an "H" cross section;

the thickness of each branch of the "H" cross section of the finger is equal to 2 mm; and the two opposite faces of the finger facing the axial stops are flat.

According to another aspect, there is described a fan, in particular for a ventilation installation for a vehicle, comprising an electric motor, in particular a brushless electric motor, a fan impeller, rotationally driven by the electric motor, and a motor support as described above in all its combinations, the motor, in particular the stator of the motor, being fixed to the inner ring of the motor support.

According to another aspect, there is described a heating, ventilation and/or air conditioning installation for a motor vehicle, comprising a duct and a fan as described above, in all its combinations, adapted to set a flow of air in motion in the duct.

BRIEF DESCRIPTION OF THE DRAWINGS

Further features, details and advantages will become more clearly apparent from reading the description given below by way of illustration and with reference to the following figures.

DETAILED DESCRIPTION OF THE INVENTION

Figure 1:
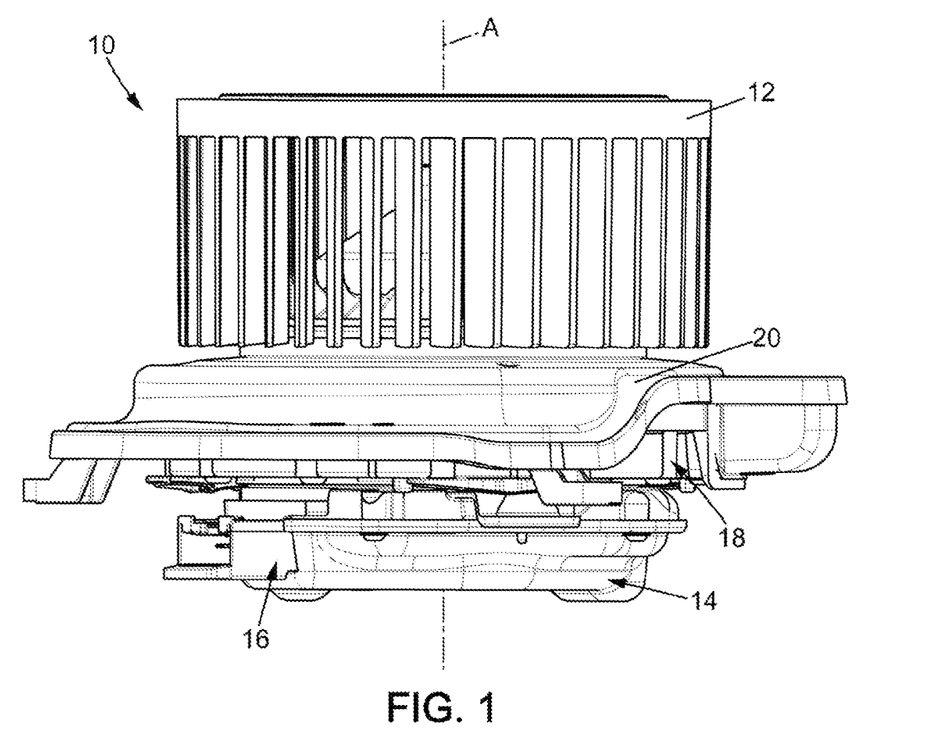
FIG. 1 is a schematic side view of an example of a fan for a heating, ventilation and/or air conditioning installation for a motor vehicle.
Figure 2:
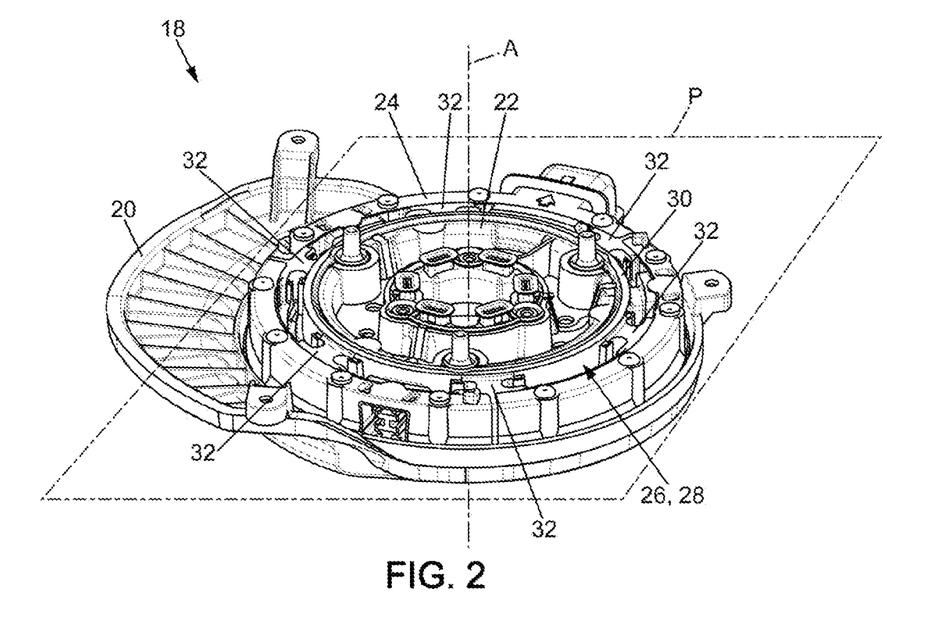
FIG. 2 is a schematic perspective view of a subassembly of the fan of FIG. 1, comprising a motor support and a fan housing.
Figure 3:
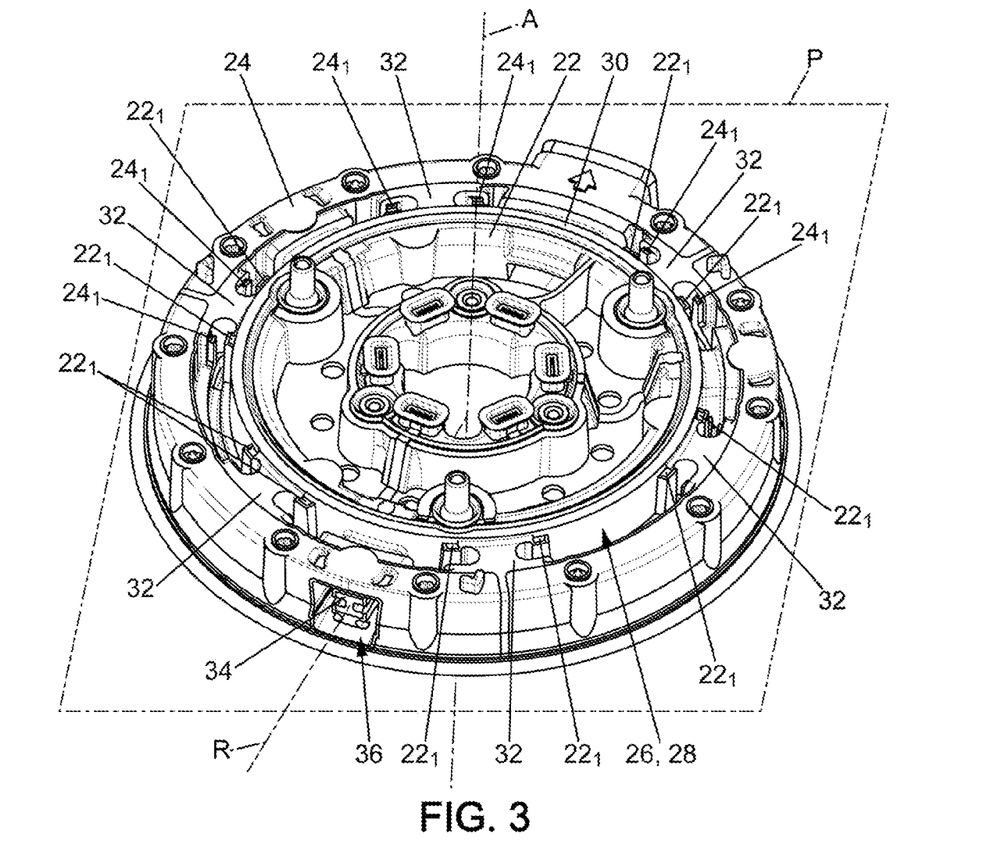
FIG. 3 is a schematic perspective view of a subassembly of the motor support of FIG. 2.
Figure 4:
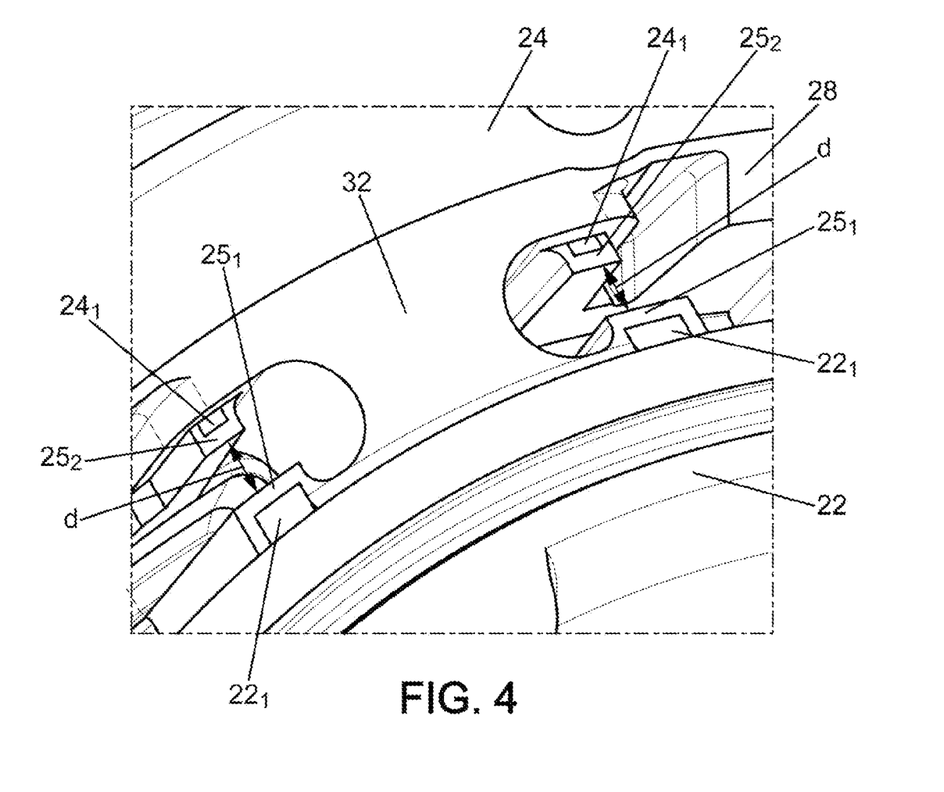
FIG. 4 shows a detail of the subassembly of the motor support of FIG. 3.

FIG. 1 schematically illustrates a side view of a fan 10 for a heating, ventilation and/or air conditioning installation for a motor vehicle. As is conventional, such a heating, ventilation and/or air conditioning installation for a motor vehicle comprises a ventilation circuit, a fan 10 for causing the air to move in the ventilation circuit, and an element for heating and/or an element for cooling the flow of air set in motion by the fan 10.

As illustrated in FIG. 1, the fan 10 essentially comprises a fan impeller 12 and an electric motor 14, here hidden by a motor cowl 16, for driving the rotation of the fan impeller 12 about its axis A. The electric motor 14 is for example a brushless motor. The fan 10 also comprises a motor support 18 enabling the electric motor 14 to be assembled on a support. In this particular instance, the electric motor 14 is connected to a deflector 20 of the motor support 18, the deflector 20 forming part of the ventilation circuit of the heating, ventilation and/or air conditioning installation.

The motor support 18 is described in greater detail in what follows.

As visible in the figures, the motor support 18 essentially comprises an inner ring 22, an outer ring 24 and a decoupling element 26 interposed between the inner ring 22 and the outer ring 24. The decoupling element 26 is aimed at limiting the transmission of vibration from one of the two rings 22, 24 to the other of the two rings 22, 24.

The decoupling element 26 here forms a first decoupling element 28, intended to limit a relative movement of the two rings 22, 24 in a common plane P of extension of the two rings 22, 24. The common extension plane P of the two rings 22, 24 is here normal to the axis A of rotation of the fan impeller 12.

The first decoupling element 28 comprises, in the example shown, an elastic ring 30. The elastic ring is here made of elastomeric material. By way of example, the elastomeric material is SEBS (polystyrene-b-poly(ethylene-butylene)-b-polystyrene). Alternatively, the elastic ring 30 can be made of silicone.

The inner 24, outer 24 and elastic 30 rings are here coaxial, with a common axis, namely the axis of rotation A of the fan impeller 12. In the following, the axis A continues to be named the axis of rotation A of the fan impeller 12. It should be noted, however, that this axis A corresponds in fact to the axis of the inner ring 22, to the axis of the outer ring 24 and to the axis of the elastic ring 30, in particular.

The elastic ring 30 is for example overmolded on the inner 22 and outer 24 rings. The elastic ring 30 thus secures the inner 22 and outer 24 rings. The elastic ring 30 covers in particular here the radially inner surface of the outer ring 24, oriented toward the inner ring 22, and the radially outer surface of the inner ring 22, oriented toward the outer ring 24.

The first decoupling element 28 also comprises, in the example shown, a plurality of first elastic blocks 32. The first blocks 32 are here interposed between the inner ring 22 and the outer ring 24. Each first block 32 here has an "H" cross section, the side arms of which are oriented in an orthoradial direction with respect to the axis A of rotation of the fan impeller 12, and the crossbar of which is oriented in a radial direction with respect to the axis A of rotation of the fan impeller 12. Advantageously, each first block 32 is flush with the inner ring 22 and/or the outer ring 24, in the direction of the axis A of rotation of the fan impeller 12. This avoids sharp edges in the decoupling element 26, which are likely to create incipient breaks in the decoupling element 26.

Each first block 32 has for example a thickness, measured in the direction of the axis A of rotation of the fan impeller 12, greater than or equal to 10 mm, preferably greater than or equal to 14 mm, and/or less than or equal to 20 mm, preferably less than or equal to 16 mm.

In the example illustrated, the first decoupling element 28 comprises six first elastic blocks 32, associated in pairs of neighboring first blocks 32. The three pairs of neighboring first blocks 32 are regularly distributed angularly around the axis A of rotation of the fan impeller 12.

The first blocks 32 are for example made of elastomeric material. By way of example, the elastomeric material is SEBS (polystyrene-b-poly(ethylene-butylene)-b-polystyrene). Alternatively, the elastic first blocks 32 can be made of silicone.

In the example shown, the first blocks 32 are integral with the elastic ring 30.

Furthermore, to further limit the relative movements of the inner ring 22 with respect to the outer ring 24 in a radial direction with respect to the axis A of rotation of the fan impeller 12, the inner ring 22 has on its radially outer surface at least a first lug 221, projecting toward the outer ring 24. The first lug 221 here has a parallelepipedal shape. The first lug 221 can extend over substantially the entire height of the inner ring 22, measured in the direction of the axis A of rotation of the fan impeller 12. The first lug 221 is here covered by the material forming the elastic ring 30. In particular, the face of the first lug 221 oriented toward the outer ring 24 is covered by the material forming the elastic ring 30. The first decoupling element 28 thus forms a first radial stop 251 capable of limiting a relative radial movement of the inner 22 and outer 24 rings with respect to each other. The first radial stop 251 advantageously extends between the inner ring 22 and the outer ring 24, thus limiting the size, in particular axial size, of the motor support 18. The first radial stop 251 here is flush with the inner ring 22, in the direction of the axis A of rotation of the fan impeller 12.

Similarly, the outer ring 24 has on its radially inner surface at least a second lug 241, projecting toward the inner ring 24. The second lug 241 here has a parallelepipedal shape. The second lug 241 may extend over substantially the entire height of the outer ring 24, measured in the direction of the axis A of rotation of the fan impeller 12. The second lug 241 is here covered by the material forming the elastic ring 30. In particular, the face of the second lug 241 oriented toward the inner ring 22 is covered by the material forming the elastic ring 30. The first decoupling element 28 thus forms a second radial stop 252 capable of limiting a relative radial movement of the inner 22 and outer 24 rings with respect to each other. The second radial stop 252 advantageously extends between the inner ring 22 and the outer ring 24, thus limiting the size, in particular axial size, of the motor support 18. The second radial stop 252 here is flush with the outer ring 24, in the direction of the axis A of rotation of the fan impeller 12.

Here, advantageously, the lugs 221, 241 of the inner 22 and outer 24 rings are aligned in pairs in a radial direction. Thus, the first and second stops 251, 252 are aligned in pairs, in a radial direction with respect to the axis A of rotation of the fan impeller 12. This makes it possible to further limit the travel of the inner 22 and outer 24 rings, relative to each other, in a radial direction. For example, the distance d separating a first stop 251 from the associated second stop 252, aligned with the first stop 251 in a radial direction, is between 2 mm and 4 mm. The distance 'd' between the two stops 251, 252 is measured in a radial direction, in a plane normal to the direction of the axis A of rotation of the fan impeller 12.

Here, too, the lugs 221, 241 are formed in the vicinity of the first elastic blocks 32. In particular, each lug 221, 241 is formed at one end of an arm of a first block 32. Conversely, in the example shown, a lug 221, 241 is produced at each end of each arm of a first block 32. The lugs 221, 241 thus facilitate the overmolding of the first blocks 32 on the inner 22 and outer 24 rings.

As a result, each ring 22, 24 comprises in the illustrated example six lugs 221, 241 each. The six lugs 221, 241 of each ring 22, 24 are associated here by pairs of neighboring lugs 221, 241, the three pairs of neighboring lugs 221, 241 being regularly distributed angularly around the axis A of rotation of the fan impeller 12.

The assembly formed by the inner 20 and outer 22 rings, and the decoupling element 26 is received in a cavity of the deflector 20. The inner ring 22 is secured to the stator (not visible here) of the motor 14. The outer ring 24 is fixed here to the deflector 20. A layer of elastomeric material may be interposed between the outer ring 24 and the deflector 20.

Furthermore, according to the example shown in the figures, the inner ring 22 has a plurality of fingers 34. The fingers 34 extend radially outward, from the outer surface of the inner ring 22. In this case, each finger 34 has an "H" cross section, comprising two substantially flat arms 341, 342 interconnected by a crossbar 343. The arms 341, 342 are here perpendicular to the direction of the axis A of rotation of the fan impeller 12. The thickness of each arm 341, 342 and of the crossbar 343 may be between 1 mm and 3 mm. The thickness of each arm 341, 342 and of the crossbar 343 may in particular be equal to 2 mm.

In the example illustrated, the inner ring 22 has three fingers 34. The fingers 34 are preferably regularly distributed angularly around the axis A of rotation of the fan impeller 12. In particular, each finger 34 can extend in a radial direction R with respect to the axis A of rotation of the fan impeller 12 such that the plane formed by this radial direction R and comprising the axis A of rotation of the fan impeller 12 is a plane of symmetry of two first blocks 32 of a pair of neighboring first blocks 32. In other words, two neighboring first blocks 32 are arranged angularly, symmetrically on either side of an associated finger 34.

The outer ring 24 for its part comprises a plurality of receptacles 36. Each receptacle 36 is designed to accept a respective finger 34. The receptacles 36 thus open at least onto the radially inner surface of the outer ring 24. In this particular instance, the receptacles 36 pass all the way through, opening onto the radially inner surface of the outer ring 24 and onto the radially outer surface of the outer ring 24. The receptacles 36 are preferably regularly distributed angularly around the axis A of rotation of the fan impeller 12.

The housing of the fingers 34 in the receptacles 36 makes it possible to limit the possible relative tilting of the inner ring 22 with respect to the outer ring 24. By tilting, here is meant any movement of one of the rings 22, 24 relative to the other 22, 24, outside the common median plane P of the rings 22, 24, normal to the direction of the axis A of rotation of the fan impeller 12.

In the example illustrated, the receptacles 36 have dimensions such that there is a clearance between the walls of each receptacle 36 and the finger 34 housed therein. In particular, a clearance exists in the orthoradial direction, allowing a priori a relative rotation of the inner ring 22 with respect to the outer ring 24, around the axis A of rotation of the fan impeller 12.

The walls of each receptacle 36 may be covered with elastomeric material. Preferably, the elastomer layer 37 which covers the walls of each receptacle 28, in particular the side walls 361, is integral with the elastic ring 30.

Furthermore, the motor support 18 also comprises a second decoupling element 38, to limit a relative movement of the two rings 22, 24 in the direction of the axis A of rotation of the fan 12.

Here, this second decoupling element 38 comprises a plurality of second elastic blocks 40, arranged axially between the inner ring 22 and the outer ring 24. By "axially", it is meant here that each second elastic block 40 extends at least partially, preferably totally, between a part of the inner ring 22 and a part of the outer ring 24, in the direction of the axis A of rotation of the fan impeller 12.

In the example illustrated, the second blocks 40 are each arranged between a finger 34 and a wall 362, 363 of the receptacle 36 in which the finger 34 is received. In particular, each second block 40 is arranged between a flat surface of an arm 341, 342 of a respective finger 34, and a wall 362, 363 of the receptacle 36, normal to the axis A of rotation of the fan impeller 12. Thus, each finger 34 extends at least partially between a flat surface of an arm 341, 342 of a finger 34 and a wall 362, 363 of the receptacle 36, normal to the axis A of rotation of the fan impeller 12, in the direction of the axis A of rotation of the fan impeller 12.

Advantageously, two second blocks 40 are associated with each finger 34. In particular, two second blocks 40 can be arranged on either side of the same finger 34, in the direction of the axis A of rotation of the fan impeller 12. In other words, in the direction of the axis A of rotation of the fan impeller 12, each finger 34 can be contained between two second blocks 40. The two second blocks 40 associated with the same finger 34 can be identical to ensure a substantially symmetrical behavior of the motor support 18, regardless of the direction of movement of one ring relative to the other, in the direction of the axis A of rotation of the fan impeller 12.

According to the example illustrated, each second block 40 is in contact with, preferably is compressed between, a flat surface of an arm 341, 342 of the finger 34, on the one hand, and a surface 362, 363 of the receptacle 36, normal to the axis A of rotation of the fan impeller 12, on the other hand. This limits the possible travel of the finger 34 in the receptacle 36, in the direction of the axis A of rotation of the fan impeller 12. For example, each second block 40 can have an axial compression ratio greater than or equal to 5% and/or less than or equal to 25%, preferably substantially equal to 15%. The axial compression ratio may be defined as being the ratio between:

the difference between the thickness of the second block 40, measured in the direction of the axis A of rotation of the fan impeller 12, before the positioning between the finger 34 and the wall 362, 363 of the receptacle 36, normal to the direction of the axis A of rotation of the fan impeller 12, on the one hand, and the thickness of the second block 40, measured in the direction of the axis A of rotation of the fan impeller 12, after the positioning between the finger 34 and the wall 362, 363 of the housing 36, normal to the direction of the axis A of rotation of the fan impeller 12; and the thickness of the second block 40, measured in the direction of the axis A of rotation of the fan impeller 12, before the positioning between the finger 34 and the wall 362, 363 of the receptacle 36, normal to the direction of the axis A of rotation of the fan impeller 12.

The second blocks 40 can be made of elastomeric material. The elastomeric material forming the second blocks 40 can be chosen according to its hardness. This elastomeric material may in particular have a hardness greater than or equal to 25 Shore and less than or equal to 50 Shore.

The second blocks 40 can be overmolded on the fingers 34 of the inner ring 22 and/or on the walls 362, 363 of the receptacles 36 of the outer ring 24. In one embodiment appearing to be particularly advantageous, the second blocks 40 are integral with the elastic ring 30 and the first blocks 32, if applicable. The mounting of the motor support 18 is thereby made considerably easier.

Figure 5:
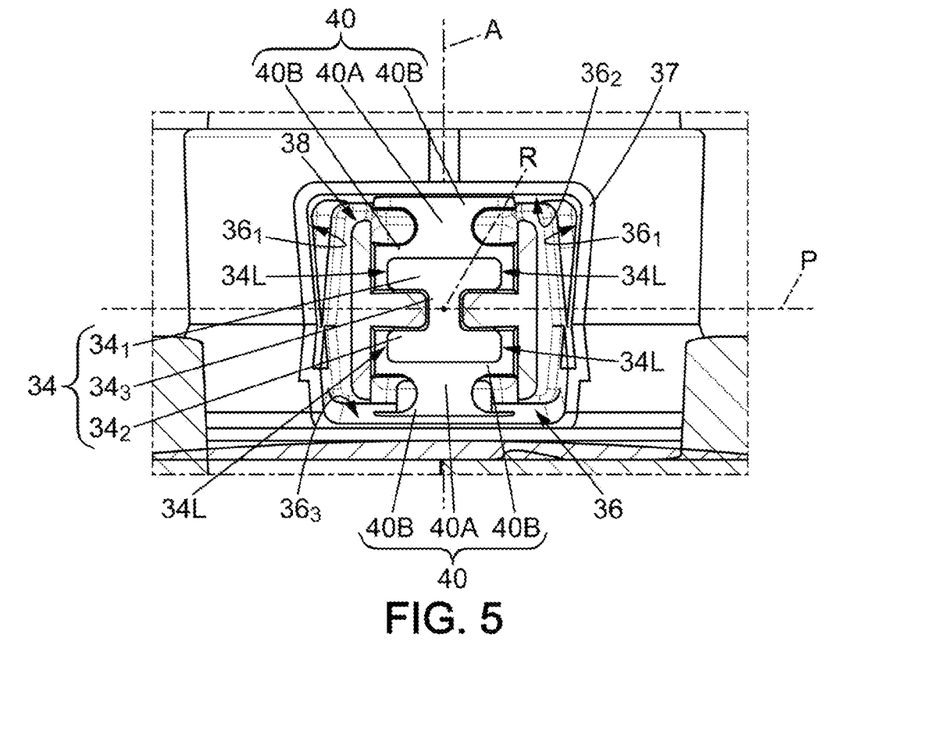
FIG. 5 is a schematic side view of a detail of the subassembly of FIG. 3.
Figure 6:
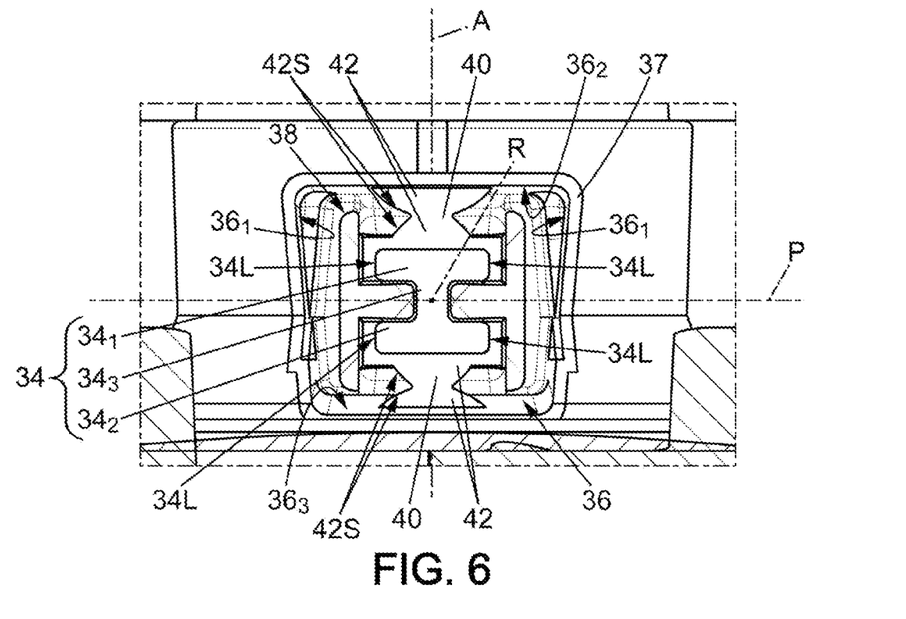
FIG. 6 is a schematic side view of a variant of the detail of the subassembly of FIG. 5.

FIGS. 5 and 6 illustrate two examples of possible shapes of the second blocks 40.

According to the example of FIG. 5, each second block 40 has a generally cylindrical shape, in that each second block 40 has a constant cross section, each second block 40 extending in a radial direction R with respect to the axis A of rotation of the fan impeller 12.

The cross section of each second block 40 is here in the shape of an "H", such that each arm 40B of the "H" is in contact either with a flat surface of an arm 341, 342 of a finger 34, or with a wall 362, 363 of the receptacle 36, normal to the axis A of rotation of the fan impeller 12. Thus, each arm 40B of a second block 40 is in contact with one of the two inner 22 or outer 24 rings, respectively.

A crossbar 40A connects the two arms 40B of the cross section of each second block 40. The crossbar 40A here has a minimum thickness substantially equidistant from the two arms 40B, in the direction of the axis of rotation A of the fan impeller 12. The crossbar 40A has a flared shape from its part corresponding to its minimum thickness toward each of the two arms 40B. The crossbar 40A thus allows a certain flexibility of the second block 40, which can thus deform.

It is noted here that the lateral ends 34L of the arms 341, 342 of a finger 34 are also covered by the associated second block 40. The second block 40 is thus held in position on the associated finger 34.

According to the example of FIG. 6, each second block 40 also has a generally cylindrical shape, in that each second block 40 has a constant cross section, each second block extending in a radial direction R with respect to the axis A of rotation of the fan impeller 12.

Here, each second block 40 has substantially the shape of two half-cylinders 42 joined by their cylindrical surfaces 42S. Like the second block 40, each half-cylinder 42 extends parallel to the radial direction R. The two half-cylinders 42 thus extend in particular along parallel axes. Here, the axes along which the two half-cylinders 42 extend are perpendicular to the axis A of rotation of the fan impeller 12.

The second block 40 thus also has, in cross section, a minimum thickness substantially equidistant from the finger 34 and the wall 362, 363 of the receptacle 36. Here again, this minimum thickness in cross section of the second block 40 allows a certain flexibility of the block 40, which can thus deform.

It may be noted that in the case of the example of FIG. 6 also, the lateral ends 34L of the branches of the finger 34 are also covered by the second block 40. The second block 40 is thus held in position on the associated finger 34.

The present disclosure is not restricted to the examples described above but encompasses all variants and combinations conceivable to a person skilled in the art within the scope of the protection sought.

In the example illustrated, six pairs of lugs, each forming a radial stop, are distributed over each of the inner and outer rings, around the common axis of the two inner and outer rings. Of course, this number of radial stops is nonlimiting. The motor support may in particular comprise two radial stops that are opposite one another with respect to the center of the inner and outer rings, or three or more radial stops, preferably regularly distributed around the common axis of the inner and outer rings.

According to a variant embodiment, the first decoupling element 28 and the second decoupling element 38 are independent. In particular, the first and second decoupling elements 26, 28 can be formed by separate parts. However, the embodiment described above, in which the two decoupling elements form one and the same part, appears advantageous in that it facilitates mounting of the motor support 18. The production of the decoupling elements 28, 29 in several parts, however, makes it possible to use different materials for each of these decoupling elements 28, 29. This can in particular make it possible to choose a material that is better suited to each of these decoupling functions.

The shape of the first and/or second blocks 32, 40 may differ from the shapes described above, by way of examples only. The shape of the first and/or second blocks 32, 40 can in particular be chosen so as to ensure satisfactory mechanical strength of these blocks 32, 40, while allowing some decoupling between the inner and outer rings 22, 24.

Also, in the examples illustrated, the inner ring 22 forms fingers 34 housed in receptacles 36 formed in the outer ring 24. However, the reverse configuration is conceivable, with the outer ring 24 having fingers 34 oriented radially toward the inner ring 22 and housed in receptacles 36 formed in this inner ring 22.

Orthoradial stops can be provided, to limit or even prevent the relative rotation of the inner ring 22 with respect to the outer ring 24, around the axis of rotation A of the fan impeller 12. These orthoradial stops can in particular be provided in the receptacles 36 and cooperate with the finger 34 received therein. These orthoradial stops can be formed by pins attached to the ring forming the receptacles 36 and extending in a receptacle, between the finger 34 which is received therein, and the side walls of the receptacle 36. Other elements can also be implemented to limit, or even prevent, the relative rotation of the rings around their common axis.

Furthermore, instead of the second elastic blocks 32, 40, one or more axial stops can be provided to limit the axial movements of each finger 34 in the associated receptacle 36. In particular, an axial stop can be provided on either side of each finger 34, in the direction of the common axis of the inner and outer rings 22, 24. The axial stop(s) can project into the receptacle 36. Each axial stop can be formed by a pin attached to the ring forming the receptacle 36. The at least one axial stop can extend in a direction substantially perpendicular to the direction of elongation of the associated finger 34. Each axial stop can project into the receptacle 36. Elastic material can then be arranged between the finger 34 and each of the associated axial stops, in contact with the finger 34 and the axial stop. The elastomeric material is then preferably compressed between the finger 34 and each of the two axial stops, the elastomeric material also having for example a compression ratio greater than or equal to 5% and/or less than or equal to 15%, more preferably substantially equal to 10%. In the case where two axial stops are associated with each finger 34, the motor support 18 may comprise the same thickness of elastic material between the finger 34 and each of the two axial stops. The elastic material can in particular be overmolded on two opposite faces of the finger 34. The elastic material may have a hardness of between 25 and 50 Shore. The elastic material in contact between the finger 34 and each of the two stops can be integral with the elastic ring 30.

The invention claimed is:

1. A motor support for a motorized fan unit of a fan of a heating, ventilation and/or air conditioning installation for a vehicle, comprising:
   two coaxial rings, including an inner ring capable of receiving one or more motor elements and an outer ring capable of being fixed to a housing forming a structural element, having a common axis,
   a decoupling element between the two coaxial rings, the decoupling element forming at least one radial stop capable of limiting a radial relative movement, in a plane normal to the common axis of the two rings, of one of the two rings with respect to the other;
   in which the inner ring and the outer ring are covered with an elastic material at least on the face oriented toward the other ring,
   in which the at least one radial stop receives at least one lug of the inner ring, the at least one lug of the inner ring projecting radially in the direction of the outer ring, the at least one lug of the inner ring being covered with elastic material, at least on the face oriented toward the outer ring.

2. The motor support as claimed in claim 1, in which the at least one radial stop extends between the inner ring and the outer ring.

3. The motor support as claimed in claim 1, in which the decoupling element includes a ring made of elastic material.

4. The motor support as claimed in claim 1, in which the at least one radial stop receives at least one lug of the outer ring, the at least one lug of the outer ring projecting radially in the direction of the inner ring, the at least one lug of the outer ring being covered with elastic material, at least on the face oriented toward the inner ring.

5. The motor support as claimed in claim 1, in which the at least one radial stop receives at least one lug of the inner ring, the at least one lug of the inner ring projecting radially in the direction of the outer ring, the at least one lug of the inner ring being covered with elastic material, at least on the face oriented toward the outer ring, and the at least one radial stop receives at least one lug of the outer ring, the at least one lug of the outer ring projecting radially in the direction of the inner ring, the at least one lug of the outer ring being covered with elastic material, at least on the face oriented toward the inner ring, wherein the at least one lug of the inner ring faces, in a radial direction, the at least one lug of the outer ring, with a distance present between the at least one lug of the inner ring, covered with elastic material, and the associated at least one lug of the outer ring, covered with elastic material.

6. The motor support as claimed in claim 5, in which the decoupling element includes a plurality of blocks made of elastomeric material, interposed between the inner ring and the outer ring, each block having a substantially "H" shape.

7. The motor support as claimed in claim 6, in which the at least one lug of the inner ring and the at least one lug of the outer ring is located at one end of an arm of an "H" formed by a block.

8. A fan for a ventilation installation for a vehicle, comprising:
   an electric motor,
   a fan impeller, rotationally driven by the electric motor, and
   a motor support including
      two coaxial rings, including an inner ring capable of receiving one or more motor elements and an outer ring capable of being fixed to a housing forming a structural element,
      a decoupling element between the two coaxial rings, the decoupling element forming at least one radial stop capable of limiting a radial relative movement, in a plane normal to a common axis of the two rings, of one of the two rings with respect to the other, in which the inner ring and the outer ring are covered with an elastic material at least on the face oriented toward the other ring,
   in which the at least one radial stop receives at least one lug of the inner ring, the at least one lug of the inner ring projecting radially in the direction of the outer ring, the at least one lug of the inner ring being covered with elastic material, at least on the face oriented toward the outer ring,
   the electric motor being fixed to the inner ring of the motor support.

9. The motor support as claimed in claim 1, in which the at least one radial stop receives at least one lug of the inner ring, the at least one lug of the inner ring projecting radially in the direction of the outer ring, the at least one lug of the inner ring being covered with elastic material, at least on the face oriented toward the outer ring, and the at least one radial stop receives at least one lug of the outer ring, the at least one lug of the outer ring projecting radially in the direction of the inner ring, the at least one lug of the outer ring being covered with elastic material, at least on the face oriented toward the inner ring, wherein the at least one lug of the inner ring faces, in a radial direction, the at least one lug of the outer ring, the distance between the at least one lug of the inner ring, covered with elastic material, and the associated at least one lug of the outer ring, covered with elastic material, being between 2 mm and 4 mm.

10. The motor support as claimed in claim 5, in which the decoupling element includes a plurality of blocks made of elastomeric material, interposed between the inner ring and the outer ring, each block having a substantially "H" shape, each block having a thickness measured in the direction of the common axis of the two rings, greater than or equal to 10 mm, and less than or equal to 20 mm.

11. The motor support as claimed in claim 5, in which the decoupling element includes a plurality of blocks made of elastomeric material, interposed between the inner ring and the outer ring, each block having a substantially "H" shape, each block having a thickness measured in the direction of the common axis of the two rings, greater than or equal to 14 mm, and less than or equal to 16 mm.

12. The motor support as claimed in claim 6, in which the at least one lug of the inner ring or the at least one lug of the outer ring is located at one end of an arm of an "H" formed by a block.

* * * * *